(12) United States Patent
Davies

(10) Patent No.: US 6,208,725 B1
(45) Date of Patent: Mar. 27, 2001

(54) ARRANGEMENT FOR CONTROLLING REMOTE TELEPHONES

(75) Inventor: Bryan Russell Davies, Aurora, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/076,558

(22) Filed: May 12, 1998

(51) Int. Cl.$^7$ .................................................. H04M 3/42
(52) U.S. Cl. ............................................. 379/201; 379/157
(58) Field of Search ..................................... 379/201, 207, 379/219, 220, 221, 156, 157, 164, 900; 370/352

(56) References Cited

U.S. PATENT DOCUMENTS

| | | | |
|---|---|---|---|
| 4,811,334 | * 3/1989 | Matt | 370/259 |
| 4,905,274 | * 2/1990 | Cooper et al. | 379/157 |
| 5,309,509 | * 5/1994 | Cocklin et al. | 379/165 |
| 5,631,954 | * 5/1997 | Evans et al. | 370/271 |
| 5,742,672 | * 4/1998 | Burk | 379/198 |
| 5,790,652 | * 8/1998 | Gulley et al. | 379/368 |
| 5,828,741 | * 10/1998 | Han | 379/157 |
| 5,870,462 | * 2/1999 | Vesterinen | 379/201 |
| 5,930,700 | * 7/1999 | Pepper et al. | 455/414 |
| 6,014,437 | * 1/2000 | Acker et al. | 379/219 |

* cited by examiner

*Primary Examiner*—Ahmad Matar
*Assistant Examiner*—Benny Q. Tieu
(74) *Attorney, Agent, or Firm*—Werner Ulrich

(57) ABSTRACT

Apparatus and a method for controlling of a telecommunications station. A controlling computer establishes a data connection to a controlled computer. The controlled computer is connected via a data connection to the station. The controlled computer receives status information from the station and forwards this information to the controlling computer. The controlling computer, responsive to receipt of user commands, send status control commands to the controlled computer which sends status control commands to the station. Advantageously, if a connection can be established between the controlling and controlled computers, the controlling computer, responsive to user commands, can control the status of the station.

14 Claims, 7 Drawing Sheets

ARRANGEMENT FOR CONTROLLING REMOTE TELEPHONES

TECHNICAL FIELD

This invention relates to the control of telephone station controlled services from a location away from the controlled telephone.

PROBLEM

Modern telephone stations provide a large number of sophisticated telephone services usually invoked through the pressing of one or more buttons on the telephone station with feedback to the user provided by lamps and displays at the telephone station. Such telephone stations are frequently connected to a computer, such as a personal computer which can effectively push buttons of the controlled telephone station, and receive lamp indications and display information from the telephone station. Thus, these telephone stations are frequently controlled by users from a computer as well as being controllable by pushing the buttons of the telephone station.

SOLUTION

Applicant has recognized that a problem of the prior art is that while these telephone stations are controllable from a directly connected computer, there is no satisfactory way of controlling these stations from a remote, or otherwise separated location. For example, a user may have initiated call forwarding to forward calls to the user's home when the user leaves the office at the end of the day; however, the user may find that he/she plans to visit a neighbor and would like to have calls forwarded not to the user's home, but to the telephone of the neighbor. Unless the user has remotely controllable call forwarding, a service which is not universally available, the user cannot remotely request that calls be forwarded to different destinations (forwarding calls from the user's home is not satisfactory, since call forwarding is not normally permitted for more than once on any call).

As another example, consider the situation of a customer who has a call forwarding feature whereby the call forwarding number is settable and retained, but not activated unless a Call Forward Activation (CFA) button, on the customer's station, is pressed. Suppose this customer has set the call forward number to his/her cellular telephone number, but usually leaves the call forwarding feature inactive, so that incoming unanswered calls go to voice mail. Suppose further that the customer, while away from the office, wishes to change the disposition of incoming calls so that instead of getting voice mail, callers will be forwarded to the pre-stored cellular telephone number. Since the customer does not have physical access to the telephone station, he or she cannot press the CFA button and therefore cannot invoke call forwarding.

A problem of the prior art therefore, is that there is no satisfactory arrangement for controlling a telephone station from a remote or unconnected location. It is an object of this invention to provide such facilities without requiring changes in the software of the public switched telephone network since it is difficult to insure that such changes will be widely available to customers.

The above problem is solved and an advance is made over the prior art in accordance with Applicant's invention wherein a controlled telephone station is controlled by a connected computer (the controllable computer), and the controllable computer is connected by a data network to a controlling computer; the controlling and controlled computer have a software package for controlling a telephone, displaying the status and displays of that telephone, and communicating with another computer equipped with that application over a data network. The controlled computer transmits to the controlling computer all status and display information received from the controlled telephone station, and the controlling computer transmits to the controlled computer requests to control buttons on the controlled telephone.

In accordance with one feature of Applicant's invention, the controlled telephone has caller calling number identification, which is displayed on the telephone, and forwarded to the controlled computer. Controlled computer then forwards this display information to the controlling computer which allows a user at the controlling computer to monitor incoming calls. The user at the controlling computer can request a call transfer by the controlled telephone in order to pickup a particular telephone call.

In accordance with another feature of Applicant's invention, a user at a controlling computer can remotely operate, or release pre-set call forward buttons, remotely program a pre-set call forwarding button, or remotely cause the controlled telephone to originate a request for a dialed call forwarding number, the number being supplied from the controlling computer.

In accordance with another feature of Applicant's invention, the user at the controlling computer can request the controlled station to call a station of the controlling customer, and can then control the establishment of a conference call under the control of the controlling computer from the conference call being originated from the controlled telephone station.

More generally, in accordance with Applicant's invention, any function which can be performed through the operation of buttons or keys of the controlled telephone station, (the buttons and keys, including the buttons of a dialing keypad), can be controlled from the controlling computer.

DETAILED DESCRIPTION

Figure 1:
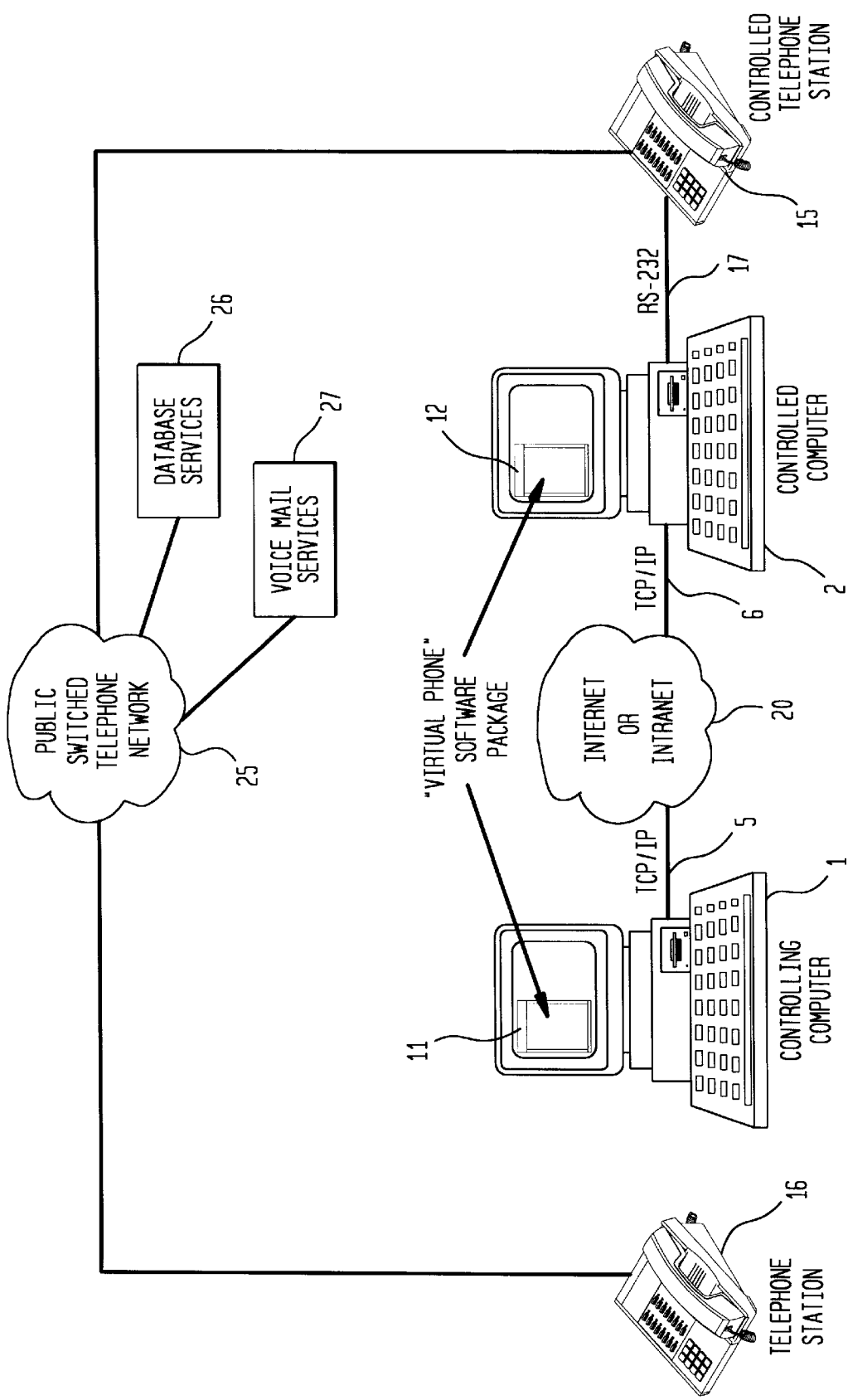
FIG. 1 is a block diagram of apparatus for implementing Applicant's invention.

FIG. 1 is a block diagram illustrating the operation of Applicant's invention. A controlling computer 1 is connected to a controlled computer 2 via a data connection, and in Applicant's preferred embodiment, this data connection is provided by Internet or Intranet network 20 to which computer 1 has access via data link 5, and computer 2 has access via a data link 6. The connections between the computer use Internet protocol and include a virtual connection between applications on the computers, the virtual connection being established using the transport control protocol, (TCP). Computer 2 communicates with the controlled telephone station 15 over a data link 17. In Applicant's preferred embodiment, this data link is the well known RS-232 data link which has adequate bandwidth for transmitting required information and control signals between computer 2 and telephone station 15. Computers 1 and 2 each have application software for implementing Applicant's invention; this application software is called a virtual phone application. The software is identical in the controlling and controlled computer which has the advantage that the controlled computer can become a controlling computer under other circumstances. The controlled telephone station is connected to the public switched telephone network 25, which includes the local switch serving that telephone station. That switch can provide services such as voice mail shown in the application block 27. In addition, PSTN 25 can provide access to data, such as data stored in data base 26.

Telephone station 15 is connected to the public switched telephone network, and therefore can make outgoing calls, and receive incoming calls. Telephone station 16, also connected to the public switched telephone network, can be a telephone station accessible to the user of computer 1, or it can simply represent any telephone station in the network depending on the application.

The virtual phone application performs a number of functions. It receives status information concerning the controlled telephone station 15, either directly over the data link interconnecting a computer with telephone station 15, or from the Internet or Intranet 20 connection for receiving information provided by the virtual phone application of the controlled computer. The virtual phone application, in response to inputs received via a user interface from the user, can generate a request for actions to be performed by the controlled telephone; these requests can be sent over the Internet or Intranet connection to the controlled computer, or can be sent from the controlled computer to the controlled telephone station, or both. The most important requests are those that are sent over an Internet or Intranet connection to the controlled computer, thence to the controlled telephone station. The virtual phone application also supports a message system for transmitting data over the Internet or Intranet between the virtual phone application of the controlling and controlled computers.

Figure 2:
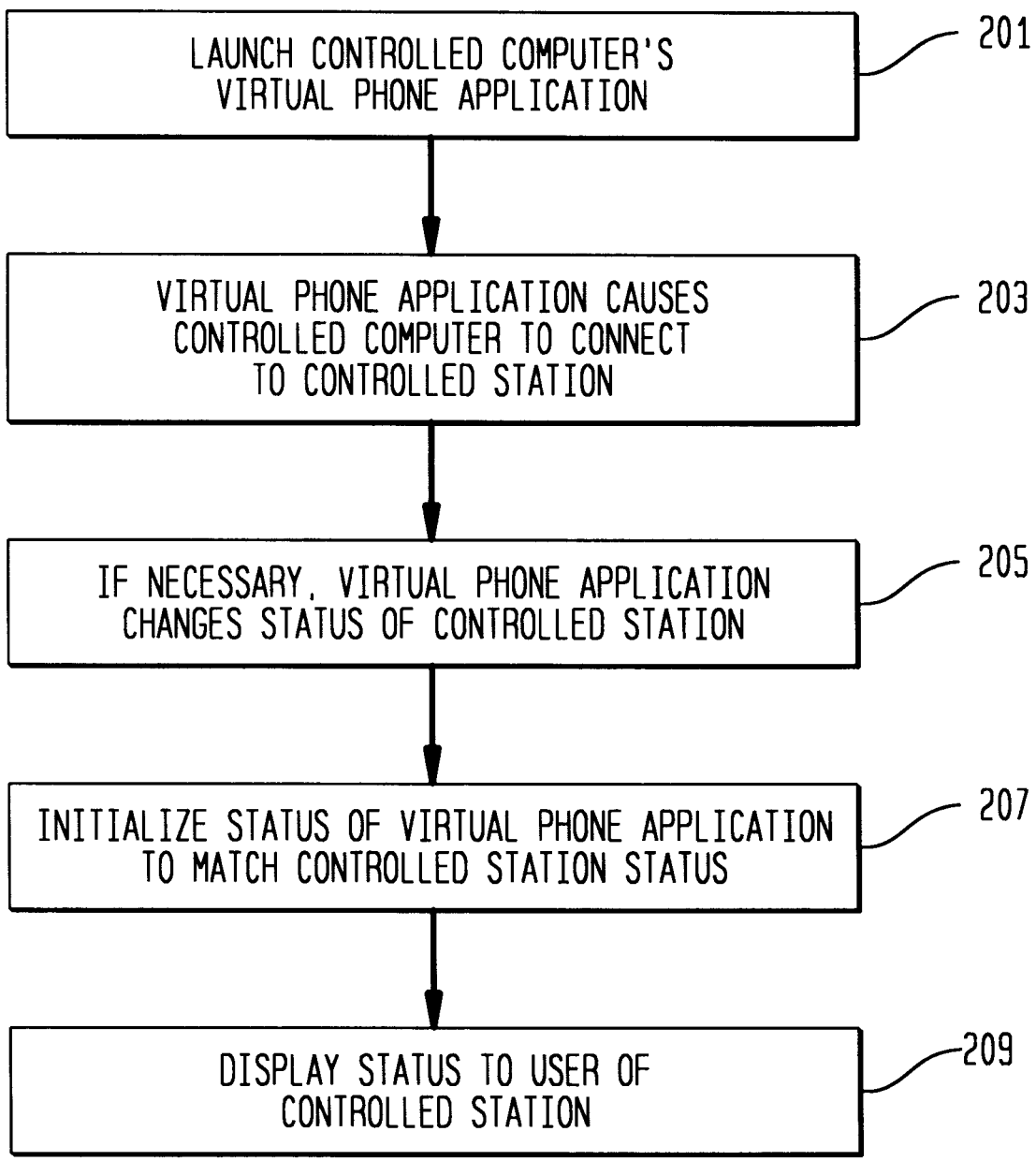
FIG. 2 is a flow chart illustrating operations for setting up a controlled computer to enable that computer to control the controlled telephone station.

FIG. 2, which is known from the prior art, is a flow diagram illustrating the process of setting up the controlled computer and the controlled station to permit subsequent control from a controlling computer. The virtual phone application is launched in the controlled computer (Action Block 201). The controlled computer then connects to the controlled station so that the controlled station will transmit status signals to the controlled computer, and accept status change requests (operation or release of keys, or buttons), from the controlled computer (Action Block 203). If necessary, the controlled computer can change the status of the controlled station. The controlled computer then initializes the status of the controlled station to a known state, (Action Block 207). The virtual phone application then displays the status to the user of the controlled station (Action Block 209). The display is performed to allow the user to monitor the actions of the controlled telephone station.

Figure 3:
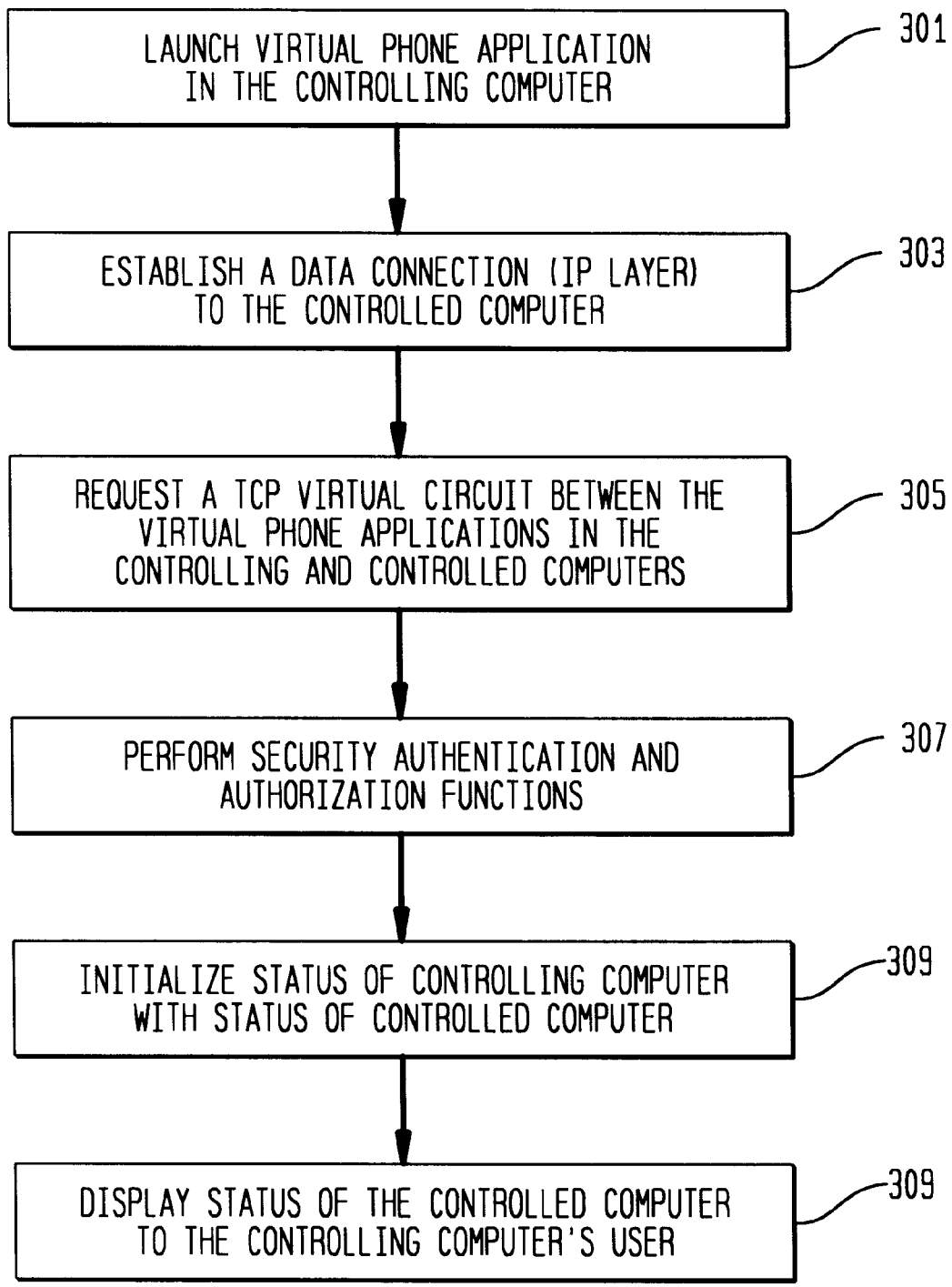
FIG. 3 is a flow diagram illustrating operations for setting up the controlling computer, and establishing communications between the controlling computer and the controlled computer.

FIG. 3 illustrates the process of setting up the controlling computer. The virtual phone application is launched in the controlling computer (Action Block 301). The controlling computer controls the establishment of a data connection (Internet Protocol), (IP), layer to the controlled computer, (Action Block 303). The controlling computer requests a transport control protocol. (TCP), virtual circuit between the virtual phone applications of the controlling and controlled computers, (Action Block 305). A security function is then performed between the two computers. This security function includes a verification as to the identity of the controlling computer, and then the provision of a password from that controlling computer. The security function is performed in accordance with techniques well known in the prior art, (Action Block 307). The status of the controlling computer is then initialized to match the status of the controlled computer, which in turn matches the status of the controlled station (Action Block 309), (status in this case refers to that portion of the overall state of the virtual phone application that reflects the status of the controlled telephone station). This status is then displayed to the user of the controlling computer, (Action Block 311). The user is then prepared to interface with the virtual phone application in order to provide commands for status changes of the controlled telephone. The virtual phone application accepts and interprets commands received from a user.

Figure 4:
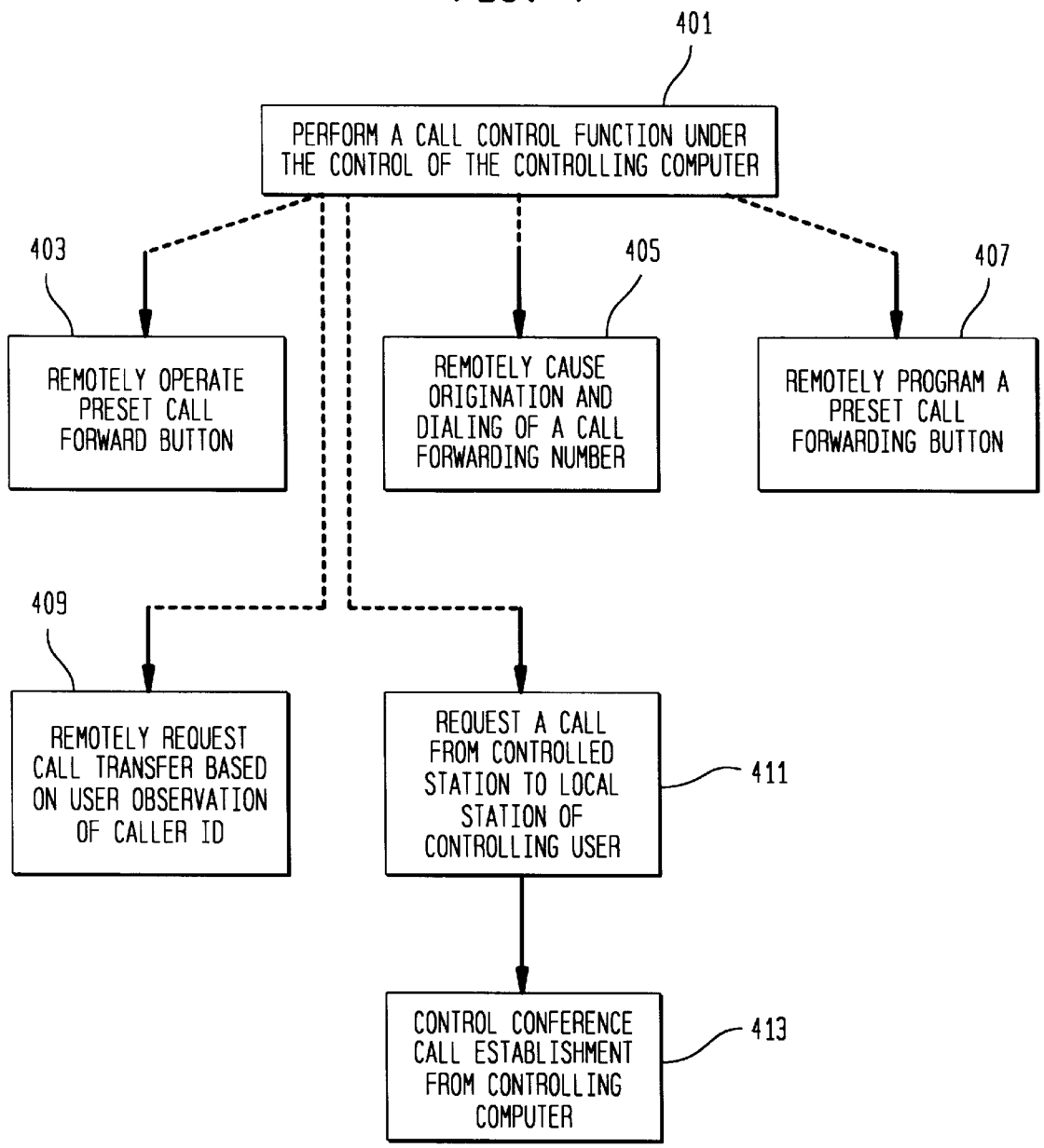
FIG. 4 illustrates a number of services which can be implemented from the controlling computer.

FIG. 4 illustrates a number of applications which can be performed under the control of the controlling computer. Action Block 401 simply is a summary of these various applications, and indicates that the controlling computer controls the performance of a call control function by the controlled telephone station. The controlling computer can request that a pre-set call forward button of the controlled telephone station be operated, (Action Block 403). The result of operating this call forward button is that calls to the controlled telephone station are automatically forwarded to a pre-set telephone number.

The controlling computer can cause the controlled station to originate a call, and dial a call forwarding number. Subsequently, incoming calls terminating at that station will be forwarded to the dialed call forwarding number (Action Block 405). The controlling computer can cause the controlled station to program a pre-set call forwarding button to cause telephone calls to be forwarded to a different number when that pre-set call forwarding button is operated (Action Block 407). The controlling computer can request call transfer, either to a pre-set number. or to a number provided to the controlled station, (Action Block 409). This function can be invoked in case the user is monitoring incoming calls identified by caller identification to the controlled station, and decides that the particular call should be forwarded for example, to his own telephone so that the user can be connected to the calling party.

The controlling computer can request a call from the controlled station to a station of the controlling user (Action Block 411). The controlling computer can then control the establishment of a conference call originated from the controlled station, which may have the conferencing feature.

While the term "virtual telephone application" has been used in this example, the invention is not limited to telephones, but can be used with other telecommunications stations such as facsimile machines or data terminals.

Figure 5:
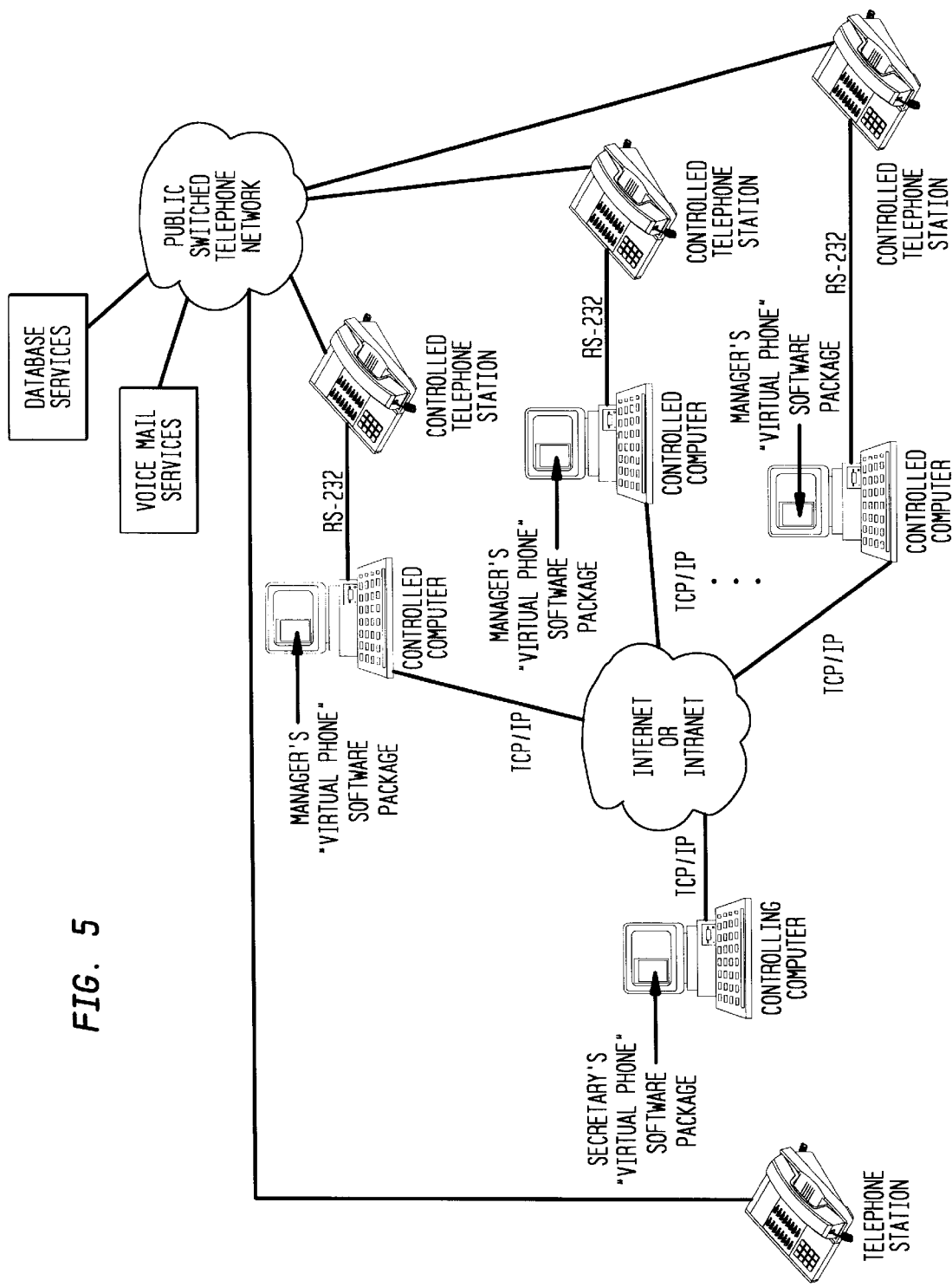
FIGS. 5–7 illustrate additional configurations for controlling multiple stations from a controlling computer, controlling multiple controlled computers and for using a controlled computer to control other controlled computers.

There are cases in which it is desirable for the virtual telephone application in the controlling computer to differ in functionality from the virtual telephone application in the controlled computer. For instance, consider a Department secretary who is tasked with managing the telephones of several managers in the Department, such as answering for a manager when he or she is not available. In this case, can a single virtual telephone application in the controlling computer (the secretary's desktop computer) control multiple controlled computer virtual telephone applications, and their associated controlled telephone stations in a one to many relationship. Each of the controlled computers has virtual telephone application as described elsewhere, but the secretary's version of the application has a condensed view of all of the subtending controlled stations. Upon launch, this special version of the virtual telephone application connects to all of the controlled computers one by one, maintaining an individual TCP (Transport Control Protocol) connection to each. Control and status information is passed from each of the subtending controlled telephone stations, through each controlled computer virtual phone application, and to the secretary's controlling computer virtual phone application. FIG. 5 shows this configuration.

In some cases, functionality beyond what an individual phone set can provide can be added to the virtual telephone application, especially in group applications such as the secretary scenario described above.

For instance, a desirable addition in the scenario where a secretary is controlling telephones of manages is additional functions on the controlled computer virtual telephone application, such as a "do not disturb" button and a "out of office" button. These buttons represent added virtual states of the controlled telephone station that are reflected back and indicated on the secretary's controlling virtual telephone application, optionally, with a graphical display of a lamp or other indicator on the secretary's computer screen. The added buttons, states, and lamps do not exist on the telephone station itself, but they do appear to the controlling computer (as well as the controlled computer) as if they did.

More generally, additional useful functions can be added to the telephone by presenting a virtual view (with the added functions) of the telephone to user via the virtual telephone application's user interface. Using Applicant's invention, these additional useful function are then remotely controllable.

Further, there are cases in which it is desirable for a single controlled computer to be able to manage and control multiple telephone stations using many RS-232 connections. Specialized hardware exists for PC abased computers to allow them to have many (8, 16, or more) RS-232 ports which are available for use by the software on that computer. The virtual telephone application can be designed to communicate with, display status of, and otherwise manage the multiple telephones that could be connected using these RS-232 connections. Then all of the functions available on all of the connected telephones are available remotely on the controlling computer with its virtual telephone application.

Figure 6:
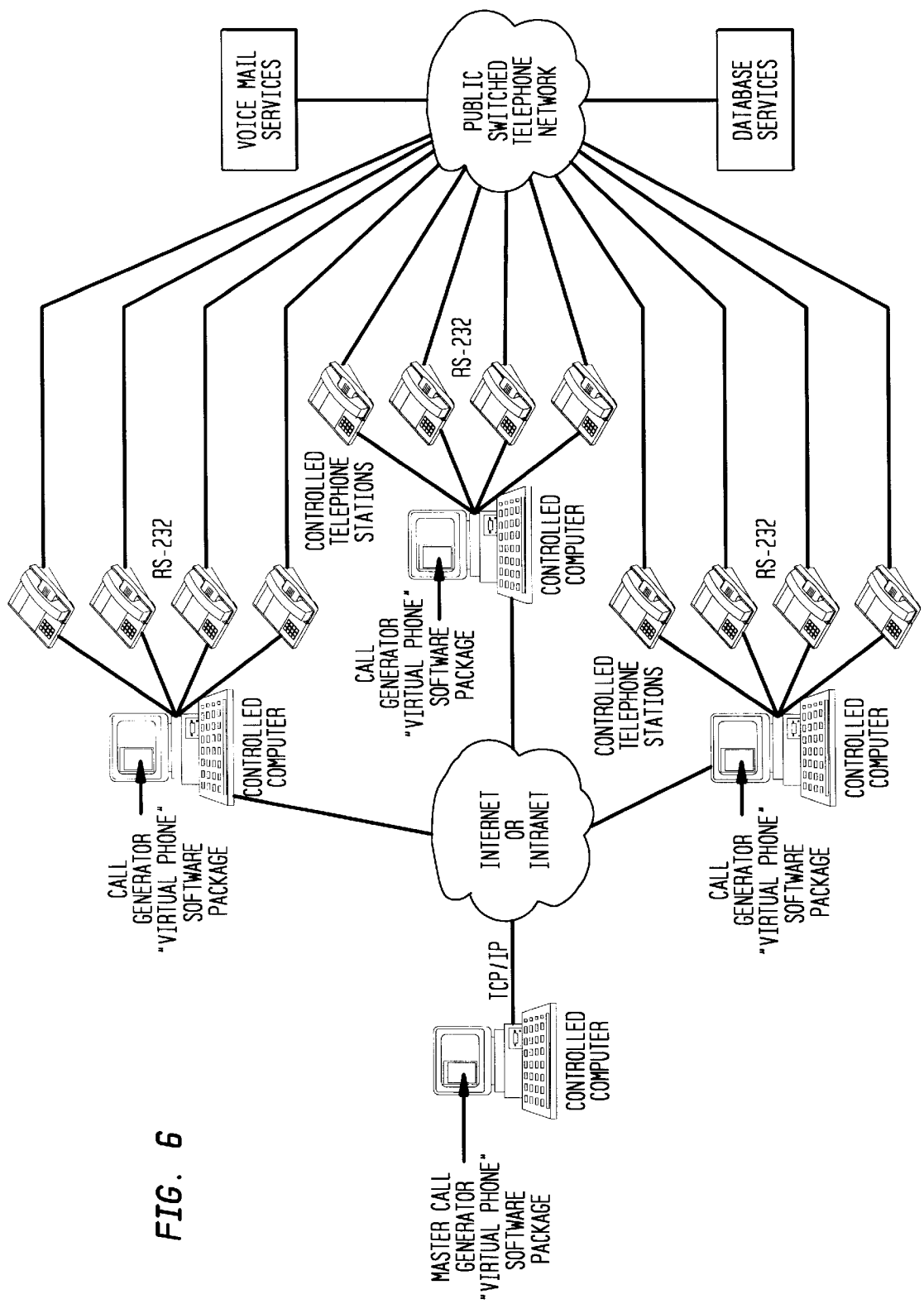

For instance, a low cost telephone automatic call generator could be constructed using this method. Each controlled computer can have 16 controlled telephone stations connected to it, and there can be many controlled computers, all controlled by a controlling computer. The remoting capability of this invention leads naturally to the ability to create such a call generator and then control the actions of each individual remotely controlled telephone. The telephones can abe directed to call one another, or exercise other functions available to the user, all under remote, automated control. This arrangement is useful in testing telephone sets as well as testing software on telephone switching systems to which the telephone stations are connected. See FIG. 6.

The fact that each controlled computer can connect to multiple controlled telephone stations means that the number of computers required is kept small for a potentially large number of controlled telephones. This, and the fact that these computers are inexpensive, off the shelf, PCs help to keep the cost of implementation low.

Additionally, the ability to replicate the controlled computers allows for scalability in an arrangement such as this. Each controlling-controlled computer TCP/IP (Internet Protocol) conversation requires a TCP socket identifier, and approximately 65,400 identifiers are available for general use. The controlling computer can control up to 65,400 controlled computers, assuming network bandwidth and processing real time on the controlling computer allows this.

Figure 7:
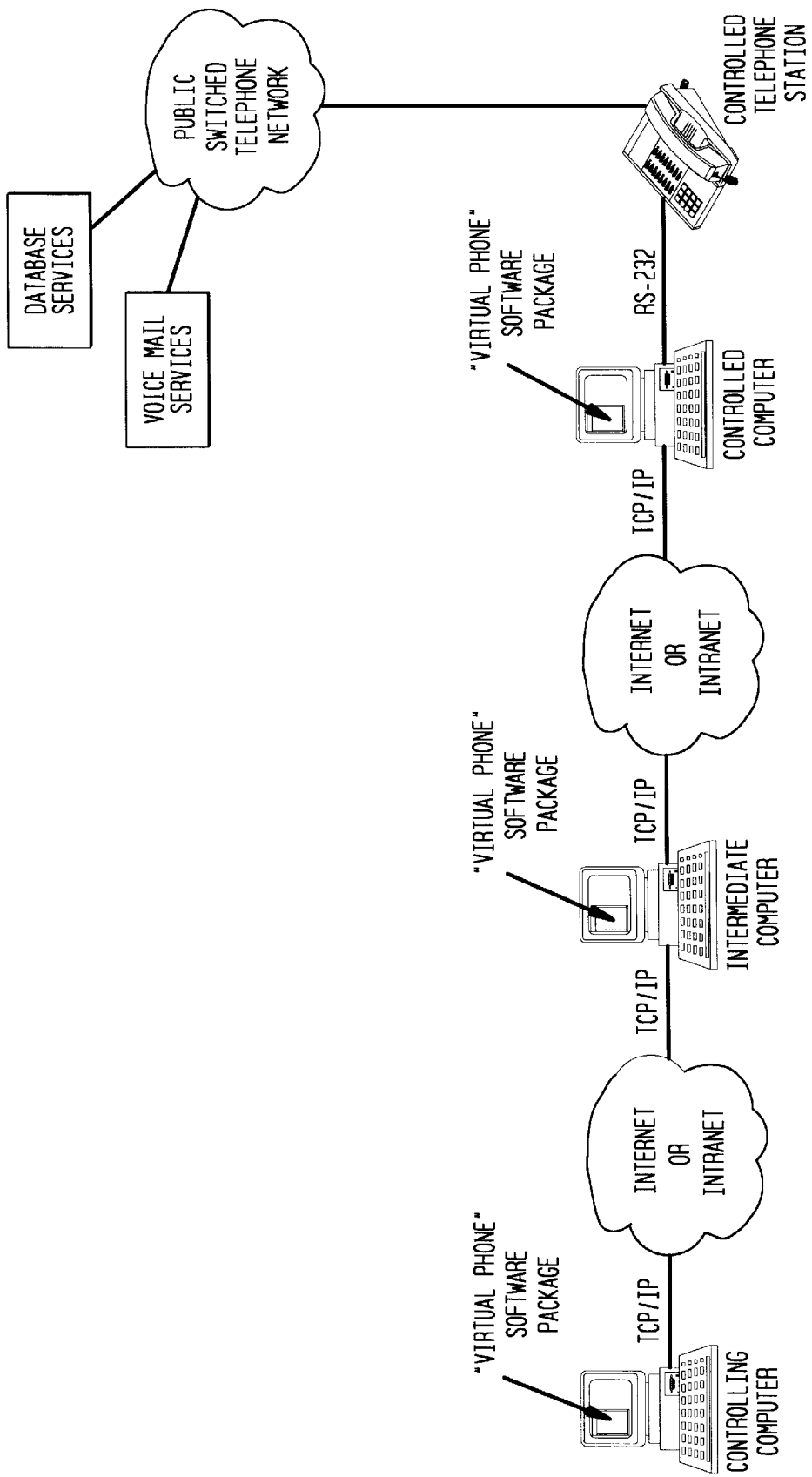

Further, this invention includes the ability of the controlling computer to itself become a controlled computer because of the nature of the connections creating a three-tier structure with a controlling computer, an intermediate computer, and a controlled computer. See FIG. 7. The intermediate computer passes telephone status information from the controlled computer to the controlling computer, and passes commands from he controlling computer to the controlled computer. This capability, combined with the one to many capability, allows for additional scalability since multi-tiered configurations can be engineered as required when a resource is expected to be scarce—such as processor real time in the controlling computer or network bandwidth between computers. The nature of the virtual telephone application allows for unlimited cascading in this fashion.

The preferred embodiment described above is only one embodiment of Applicant's invention. Many other embodiments will be apparent to those of ordinary skill in the art without departing from the scope of the invention. The invention is only limited by the attached Claims.

What is claimed is:

1. Apparatus for controlling the status of at least one of keys, buttons, and lamp displays of a telephone station from a controlling computer, not directly connected to said telephone station, comprising:

a controlled computer connected to said telephone station by a data communication means;

said controlling and controlled computers connected by a data network;

each of said controlling and controlled computers for executing a virtual telephone application;

wherein said controlled computer transmits status control information for controlling the status of at least one of keys, buttons, or lamp displays to said telephone station;

said virtual telephone application for controlling establishment of a connection between said controlling and said controlled computers;

said virtual telephone applications for controlling receiving and transmitting of status control information between said controlling and controlled computers, and between said controlled computer and said controlled station; and said virtual telephone application is further for accepting user commands.

2. The apparatus of claim 1 wherein said controlled computer, unlike the control of said virtual telephone application, receives status information from said telephone station and transmits said status information to said controlling computer.

3. The apparatus of claim 1 wherein said virtual telephone application is further for controlling displays of status of said telephone station.

4. The apparatus of claim 1 wherein a controlling computer controls a plurality of controlled computers.

5. The apparatus of claim 1 wherein a controlling computer controls a plurality of controlled computers each of which in turn controls one or more other controlled computers.

6. The apparatus of claim 1 wherein a controlled computer controls a plurality of telephone stations.

7. The apparatus of claim 1 wherein a controlling computer maintains a virtual status for said telephone station, wherein said virtual status is a status not maintained within the telephone station.

8. A method of controlling the status of at least one of keys, buttons, and lamp displays of a telecommunications station comprising the steps of:

establishing a data connection from a controlling computer to a controlled computer;

responsive to user commands, transmitting status control information for controlling the status of at least one of keys, buttons, or lamp displays from said controlling computer to said controlled computer;

transmitting status control information from said controlled computer to said telecommunications station for controlling the status of at least one of keys, buttons and lamp displays of said telecommunications station.

9. The method of claim 8 further comprising the steps of:

in said controlled computer, receiving status information from said telecommunications station; and transmitting the received status information from said controlled computer to said controlling computer.

10. The method of claim 9 further comprising the step of:

displaying a status of said telecommunications station.

11. The method of claim 8 further comprising the step of:

controlling additional controlled computers from said controlling computer.

12. The method of claim 8 further comprising the step of:

in said controlled computer, responsive to receipt of status control information from said controlling computer, transmitting status control information to another controlled computer for controlling a telecommunications station.

13. The method of claim 8 further comprising the step of:

in said controlled computer, responsive to receipt of status control information for controlling another telecommunications station, transmitting status control information to said another telecommunications station.

14. The method of claim 8 further comprising the step of:

maintaining a virtual status for said telecommunications station, wherein said virtual status is a status not maintained within said telecommunications station.

* * * * *